United States Patent
Magloire

[11] Patent Number: 6,035,371
[45] Date of Patent: Mar. 7, 2000

[54] METHOD AND APPARATUS FOR ADDRESSING A STATIC RANDOM ACCESS MEMORY DEVICE BASED ON SIGNALS FOR ADDRESSING A DYNAMIC MEMORY ACCESS DEVICE

[75] Inventor: Alexander B. Magloire, Hazlet, N.J.

[73] Assignee: 3Com Corporation, Santa Clara, Calif.

[21] Appl. No.: 08/864,475

[22] Filed: May 28, 1997

[51] Int. Cl.[7] .................................................. G06F 13/00
[52] U.S. Cl. .................. 711/105; 711/104; 711/167; 711/154
[58] Field of Search ............................... 711/2, 104, 105, 711/108, 154, 201, 210; 365/49

[56] References Cited

U.S. PATENT DOCUMENTS

| | | |
|---|---|---|
| 4,755,964 | 7/1988 | Miner . |
| 4,901,282 | 2/1990 | Kobayashi . |
| 4,937,791 | 6/1990 | Steele et al. . |
| 4,975,857 | 12/1990 | Katsura et al. . |
| 5,025,421 | 6/1991 | Cho . |
| 5,187,394 | 2/1993 | Hoshizaki et al. . |
| 5,204,841 | 4/1993 | Chappell et al. . |
| 5,226,011 | 7/1993 | Yanagisawa . |
| 5,249,160 | 9/1993 | Wu et al. . |
| 5,249,282 | 9/1993 | Segers . |
| 5,257,236 | 10/1993 | Sharp . |
| 5,265,218 | 11/1993 | Testa et al. . |
| 5,299,147 | 3/1994 | Holst . |
| 5,321,819 | 6/1994 | Szczepanek ............................. 395/325 |
| 5,327,317 | 7/1994 | Lee . |
| 5,341,486 | 8/1994 | Castle ......................................... 711/5 |
| 5,349,565 | 9/1994 | Wu et al. . |
| 5,438,535 | 8/1995 | Lattibeaudiere .......................... 365/49 |
| 5,835,965 | 11/1998 | Taylor et al. ........................... 711/211 |

*Primary Examiner*—Tuan V. Thai
*Attorney, Agent, or Firm*—Michaelson & Wallace; Peter L. Michaelson

[57] ABSTRACT

An address for addressing a static random access memory based on a row address strobe signal, a row address, a column address strobe signal, and a column address, for addressing a dynamic random access memory, is determined by (a) latching, at a time based on the row (or column) address strobe signal, at least a portion of the row (or column) address to form latched address bits and (b) concatenating at least a portion of the column (or row) address and the latched address bits to form the address for addressing the static random access memory. A system including a static random access memory, a data bus coupled with the static random access memory, an address bus, and a device coupled with the data bus and generating a row address strobe signal, a column address strobe signal, a row address applied to the address bus, and a column address applied to the address bus, may be provided with (a) a first address bus, coupling at least a portion of the address bus with a first portion of an address input of the static random access memory, (b) a second address bus, coupled with at least a portion of the address bus, (c) a third address bus, coupled with a second portion of the address input of the static random access memory, and (d) a latch having an input coupled with the second address bus, and an output coupled with the third address bus, and being responsive to an applied clocking signal which is based on one of the row address strobe signal and the column address strobe signal.

9 Claims, 13 Drawing Sheets

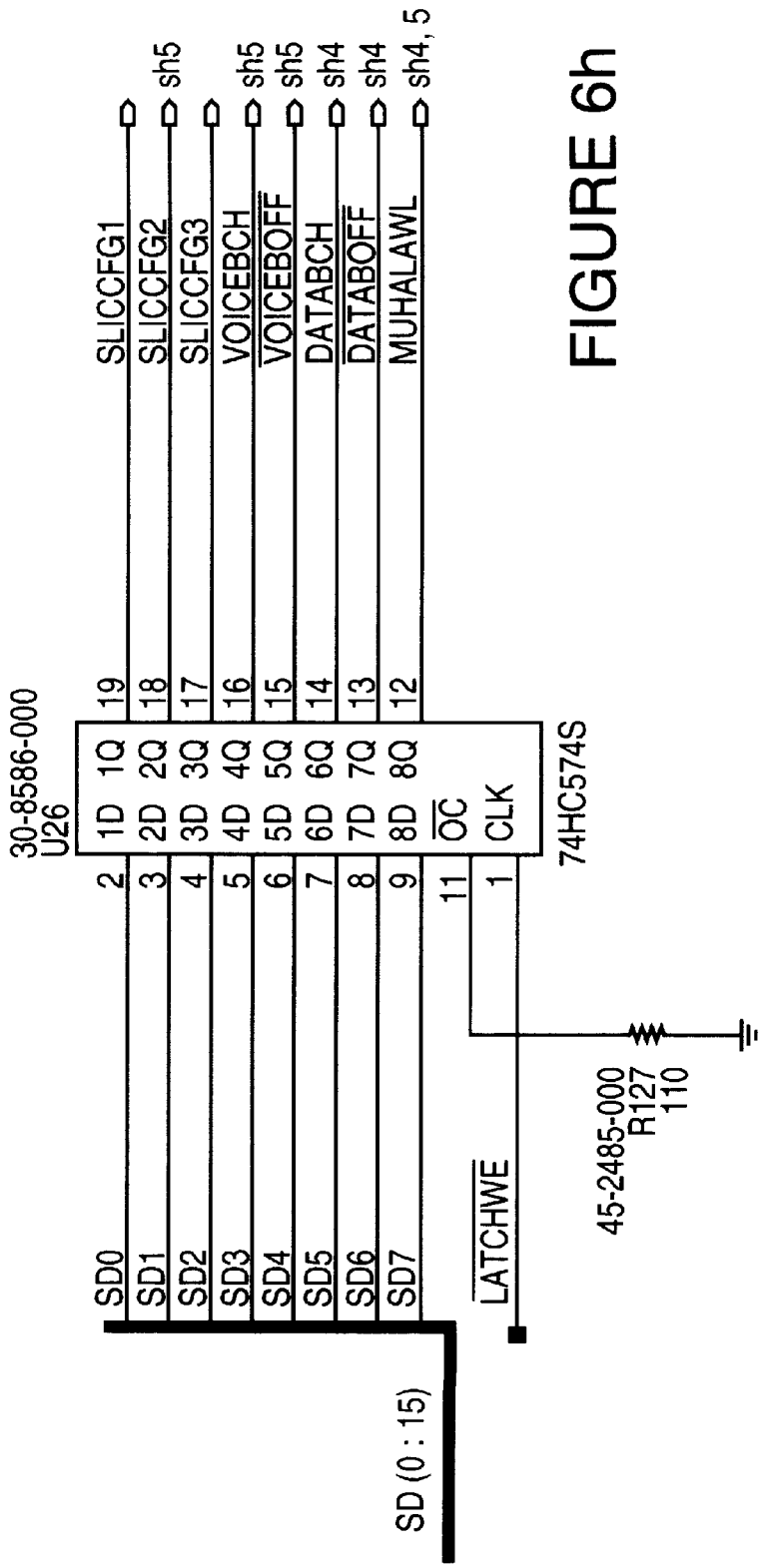

6,035,371

METHOD AND APPARATUS FOR ADDRESSING A STATIC RANDOM ACCESS MEMORY DEVICE BASED ON SIGNALS FOR ADDRESSING A DYNAMIC MEMORY ACCESS DEVICE

BACKGROUND OF THE INVENTION a. Field of the Invention

The present invention concerns addressing a static memory device. In particular, the present invention permits an address of a static random access memory device (or "SRAM") to be written to or read from using address and control signals for writing to or reading from a dynamic random access memory (or "DRAM").

b. Related Art

DRAMs are randomly addressable data storage devices. Storage locations in a DRAM are logically arranged in rows and columns. Accordingly, a storage location of a DRAM is addressed with a row address and a column address. More specifically, a row address is provided during a first time period ("a first cycle") and a column address is provided in a subsequent cycle. A row address strobe (or "RAS") signal indicates the presence of a valid row address on the address bus, while a column address strobe (or "CAS") signal indicates the presence of a valid column address on the address bus. Typically, CAS, RAS, and WE (write enable) signals applied to DRAMs are "active low". Thus, a falling edge of the RAS signal indicates that a valid row address exists on the address bus. Similarly, a falling edge of the CAS signal indicates that a valid column address exists on the address bus.

Many standard integrated circuit (or "I.C.") chips and customized I.C. chips are designed to read data from and write data to DRAMs and are configured to produce appropriate control signals such as a write enable (or "WE") signal, a RAS signal, a CAS signal, and appropriate row and column addresses to read from or write to an address of a DRAM. For example, Lucent Technologies sells a high level data link controller (or "HDLC") for controlling ISDN communications (part number T7901). This HDLC is designed to work with a DRAM. Unfortunately, DRAMs need refresh circuitry to maintain data stored in them. Such refresh circuitry adds to the cost of the DRAM. In some instances, the cost of a DRAM may be three (3) times the cost of an SRAM with comparable storage. Therefore, it would be desirable to permit chips (or other devices), designed to work with DRAMs, to instead work with SRAMs.

SUMMARY OF THE INVENTION

The present invention meets the above mentioned goal of permitting devices (such as I.C. chips for example), designed to work with DRAMs, to instead work with SRAMS by providing a method for determining an address for addressing a static random access memory based on a row address strobe signal, a row address, a column address strobe signal, and a column address, for addressing a dynamic random access memory. The method includes steps of (a) latching, at a time based on the row (or alternatively column) address strobe signal, at least a portion of the row (or alternatively column) address to form latched address bits, and (b) concatenating at least a portion of the column (or alternatively row) address and the latched address bits to form the address for addressing the static random access memory. An SRAM write enable signal may be generated based on a write enable signal and the column (or alternatively row) address strobe signal.

In a system including a static random access memory, a data bus coupled with the static random access memory, an address bus, a portion of which is coupled with the static random access memory, and a device coupled with the data bus and generating a row address strobe signal, a column address strobe signal, a row address applied to the address bus, and a column address applied to the address bus, the present invention provides a method for generating an address to the static random address memory. The method includes steps of (a) latching, at a time based on the row (or alternatively column) address strobe, at least a portion of the row (or alternatively column) address applied on the address bus to form latched address bits, and (b) concatenating at least a portion of the column (or alternatively row) address applied on the address bus and the latched address bits to generate the address to the static random access memory. An SRAM write enable signal may be generated based on a write enable signal generated by the device and the column (or alternatively row) address strobe signal.

If the row (or alternatively column) address strobe signal generated by the device is active low, then step of latching may include sub-steps of (i) inverting the row (or alternatively column) address strobe signal to generate an inverted row (or alternatively column) address strobe signal, and (ii) applying the portion (at least) of the row (or alternatively column) address to a latch based on the inverted row (or alternatively column) address strobe signal. If the column (or alternatively row) address strobe signal generated by the device is active low, and if the write enable signal is active low, then the step of generating an SRAM write enable signal includes sub-steps of (i) logically ORing the write enable signal and the column (or alternatively row) address strobe signal to generate an intermediate signal, (ii) delaying the intermediate signal to generate a delayed intermediate signal, (iii) inverting the intermediate signal to generate an inverted intermediate signal, and (iv) logically NANDing the delayed intermediate signal and the inverted intermediate signal to generate the SRAM write enable signal. The delay applied to the intermediate signal may be approximately 15 ns or no more than 15 ns.

The present invention also provides an apparatus for permitting devices (such as I.C. chips for example) designed to work with DRAMs, to instead work with SRAMs. The apparatus is used with a system which includes a static random access memory, a data bus coupled with the static random access memory, an address bus, and a device coupled with the data bus and generating a row address strobe signal, a column address strobe signal, a row address applied to the address bus, and a column address applied to the address bus. The apparatus of the present invention includes three additional address buses and a latch. A first additional address bus couples at least a portion of the address bus with a first portion of an address input of the static random access memory. A second additional address bus is coupled with at least a portion of the address bus. A third additional address bus is coupled with a second portion of the address input of the static random access memory. The latch has an input coupled with the second additional address bus, and an output coupled with the third additional address bus. The latch is responsive to an applied clocking signal which is based on the row address strobe signal or the column address strobe signal.

If the clocking signal is based on the row address strobe signal and if the row address strobe signal is active low, then the apparatus further includes an inverter, provided with the row address strobe signal, and generating an inverted row address strobe signal which is provided as the clocking signal. If, on the other hand, the clocking signal is based on the column address strobe and if the column address strobe signal is active low, then the apparatus further includes an inverter, provided with the column address strobe signal, and generating an inverted column address strobe signal which is provided as the clocking signal.

The apparatus may further include control logic for generating an SRAM write enable signal, provided to a write enable input of the static random access memory, based on a write enable signal generated by the device and the column address strobe signal or the row address strobe signal. The control logic may include a logical OR gate, a delay unit, an inverter, and a logical NAND gate. The logical OR gate may have a first input provided with the write enable signal, a second input provided with the row or column address strobe signal, and an output providing an intermediate signal. The delay unit may have an input coupled with the output of the logical OR gate, and an output providing a delayed intermediate signal. The inverter may have an input coupled with the output of the logical OR gate, and an output providing an inverted intermediate signal. Finally, the logical NAND gate may have a first input coupled with the output of the delay unit, a second input coupled with the output of the inverter, and an output coupled with a write enable input of the static random access memory. The delay unit may introduce a delay of approximately 15 ns or no more than 15 ns.

DETAILED DESCRIPTION

The present invention concerns novel methods and apparatus for permitting devices (such as I.C. chips for example), designed to work with DRAMs, to work instead with SRAMs. The following description is presented to enable one skilled in the art to make and use the invention, and is provided in the context of a particular application and its requirements. Various modifications to the preferred embodiment will be apparent to those skilled in the art, and the general principles set forth below may be applied to other embodiments and applications. Thus, the present invention is not intended to be limited to the embodiment shown.

The present invention functions to convert control and address signals used to read data from and write data to a DRAM, into control and address signals used to read data from and write data to, respectively, an SRAM.

Figure 1:
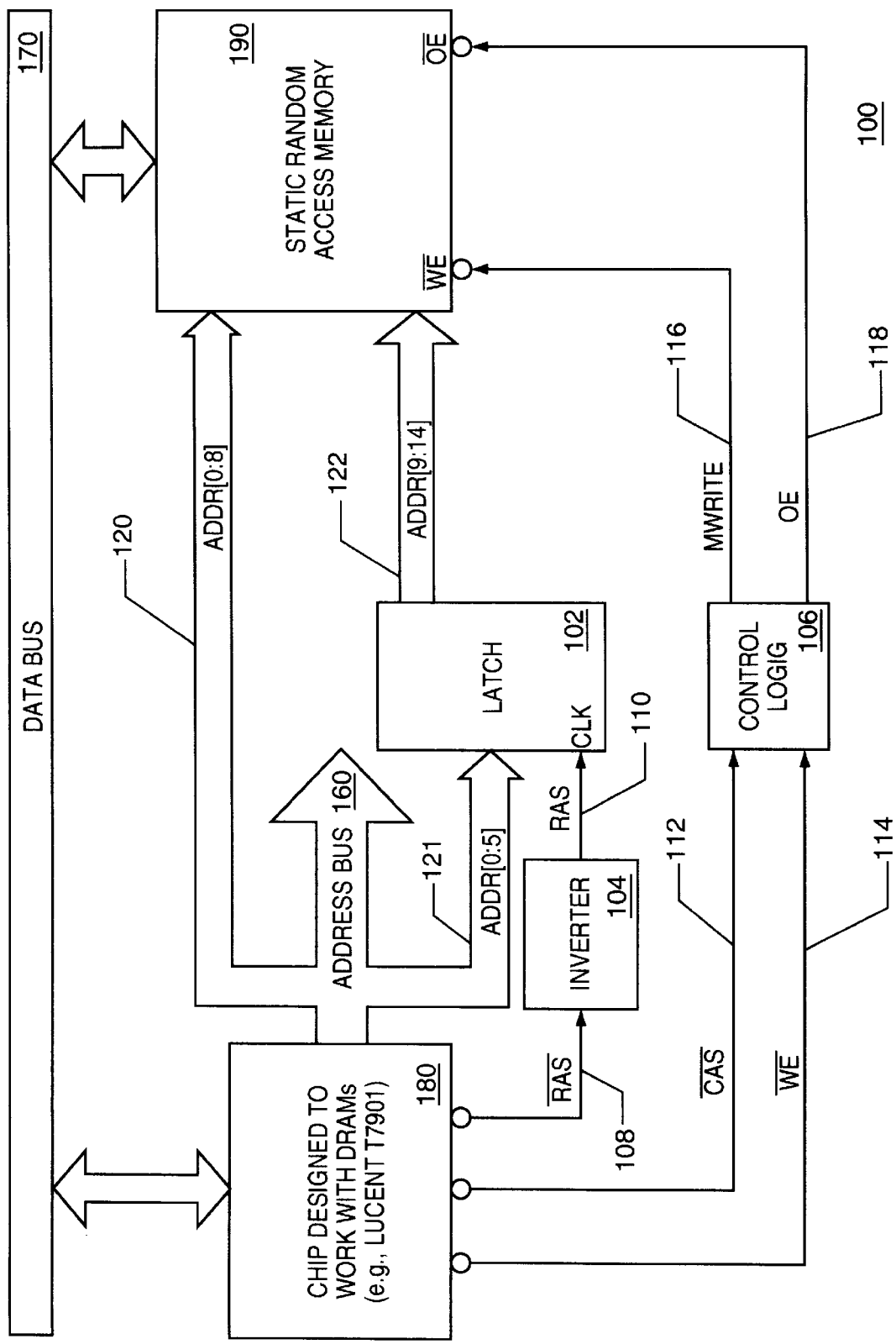
FIG. 1 is a high level block diagram of a system using an apparatus of the present invention.

FIG. 1 is a high level block diagram of an apparatus of the present invention used in a system 100 having a chip 180 designed to work with DRAMs, an SRAM 190, a data bus 170, and an address bus 160. As can be seen from FIG. 1, the chip 180 generates a row address strobe (RAS) signal (See line 108.), a column address strobe (CAS) signal (See line 112.), and a write enable (WE) signal (See line 114.). In the exemplary system 100, the write enable, row address strobe, and column address strobe signals are "active low". That is, they act as triggers on their falling edge and/or are valid when low. Naturally, it is possible that one or more of these signals may be "active high". Specific apparatus and methods designed to work with such "active high" signals are not described in detail since one skilled in the art, based on this disclosure, could make appropriate modifications to the teachings shown herein without undue experimentation. The chip 180 also generates row and column addresses on a ten (10) bit address bus 160. An eight (8) bit data bus 170 is also provided. Naturally, the widths of the address bus 160 and the data bus 170 could be different.

Basically, the device of the present invention includes a first partial address bus 120, a second partial address bus 121, a latched partial address bus 122, a latch 102, an inverter 104 (not needed if RAS signal is active high), and control logic 106.

In the exemplary apparatus depicted in the system 100 of FIG. 1, the first partial address bus 120 includes bits 0 through 8 of the ten (10) bit address bus 160; the second partial address bus 121 includes bits 0 through 5 of the ten (10) bit address bus 160. The first partial address bus 120 is coupled with address pins 0 through 8 of the SRAM 190. The second partial address bus 121 is coupled with a data input of the latch 102. The clocked output of the latch 102 is provided, via the latched address bus 122, to address pins 9 through 14 of the SRAM 190.

An inverted RAS signal is provided from a pin of the chip 180, via line 108, to the input of the inverter 104. The output of the inverter 104 is coupled, via line 110, with the clocking pin of the latch 102. An inverted CAS signal is provided from a pin of the chip 180, via line 112, to a first input of the control logic 106. An inverted write enable signal is provided from a pin of the chip 180, via line 114, to a second input of the control logic 106. The control logic 106 provides a SRAM write (MWRITE) signal (active low), via line 116, to a write enable pin of the SRAM 190. Finally, the control logic 106 also provides an output enable (OE) signal (active low), via line 118, to an output enable pin of the SRAM 190.

Figure 2:
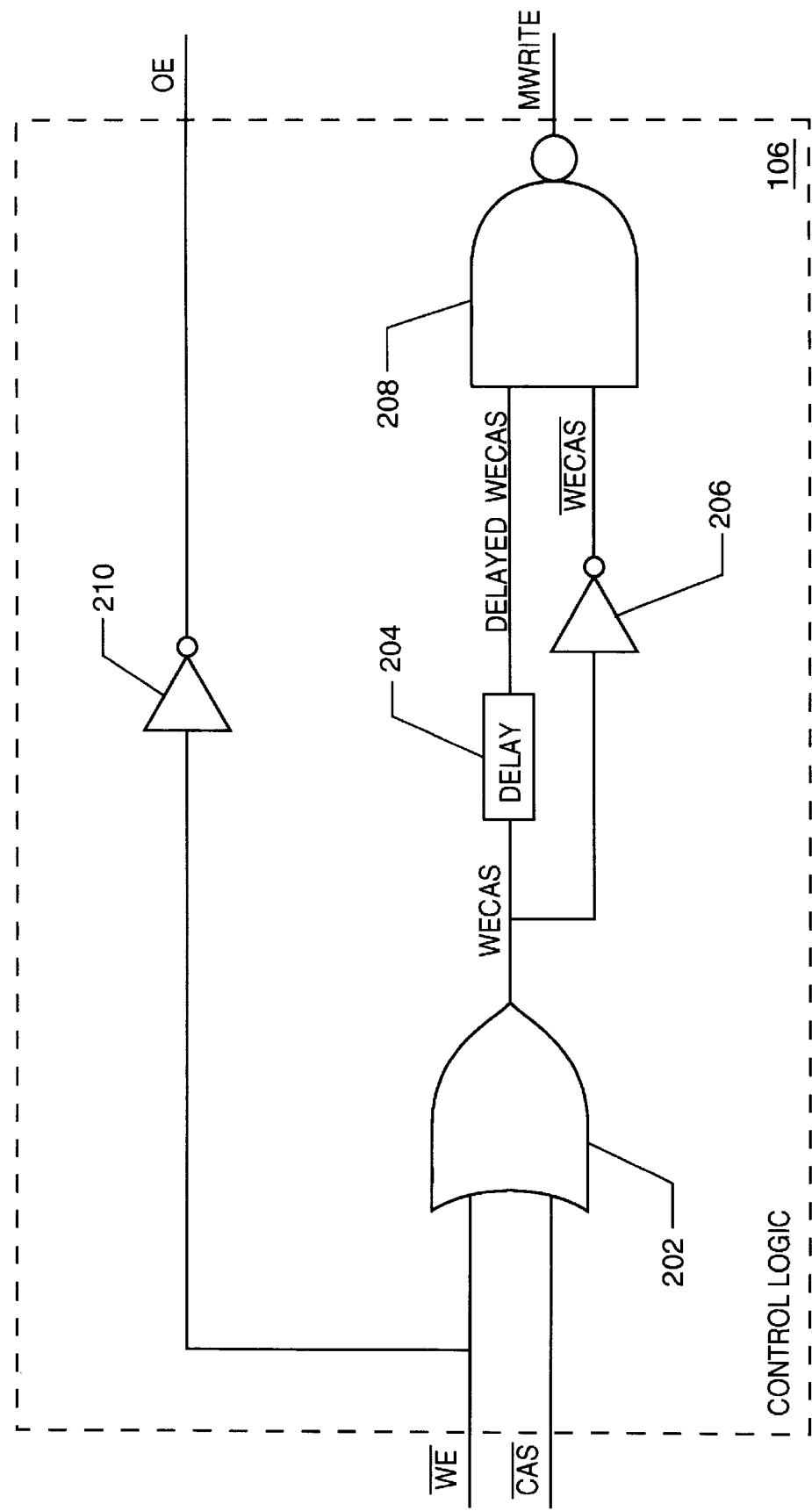
FIG. 2 is a logic diagram of the control logic used in the apparatus of FIG. 1.

FIG. 2 is a schematic diagram of the control logic 106 of FIG. 1. As shown in FIG. 2, an inverted write enable signal is provided to an inverter 210. The output of the inverter 210 is the output enable (OE) signal. In addition, the inverted write enable signal and the inverted column address strobe signal are provided to a logical OR gate 202 which generates therefrom an intermediate signal (WECAS). The intermediate signal is provided to a delay unit 204 (e.g., a 15 ns delay) which produces a time delayed intermediate signal (DELAYED_WECAS). The delayed intermediate signal (WECAS) is also provided to an inverter 206 which produces an inverted intermediate signal. Both the time delayed intermediate signal (DELAYED_WECAS) and the inverted intermediate signal are provided to the inputs of a logical NAND gate 208 which generates a SRAM write enable (MWRITE) signal (active low) therefrom.

Figure 6A:
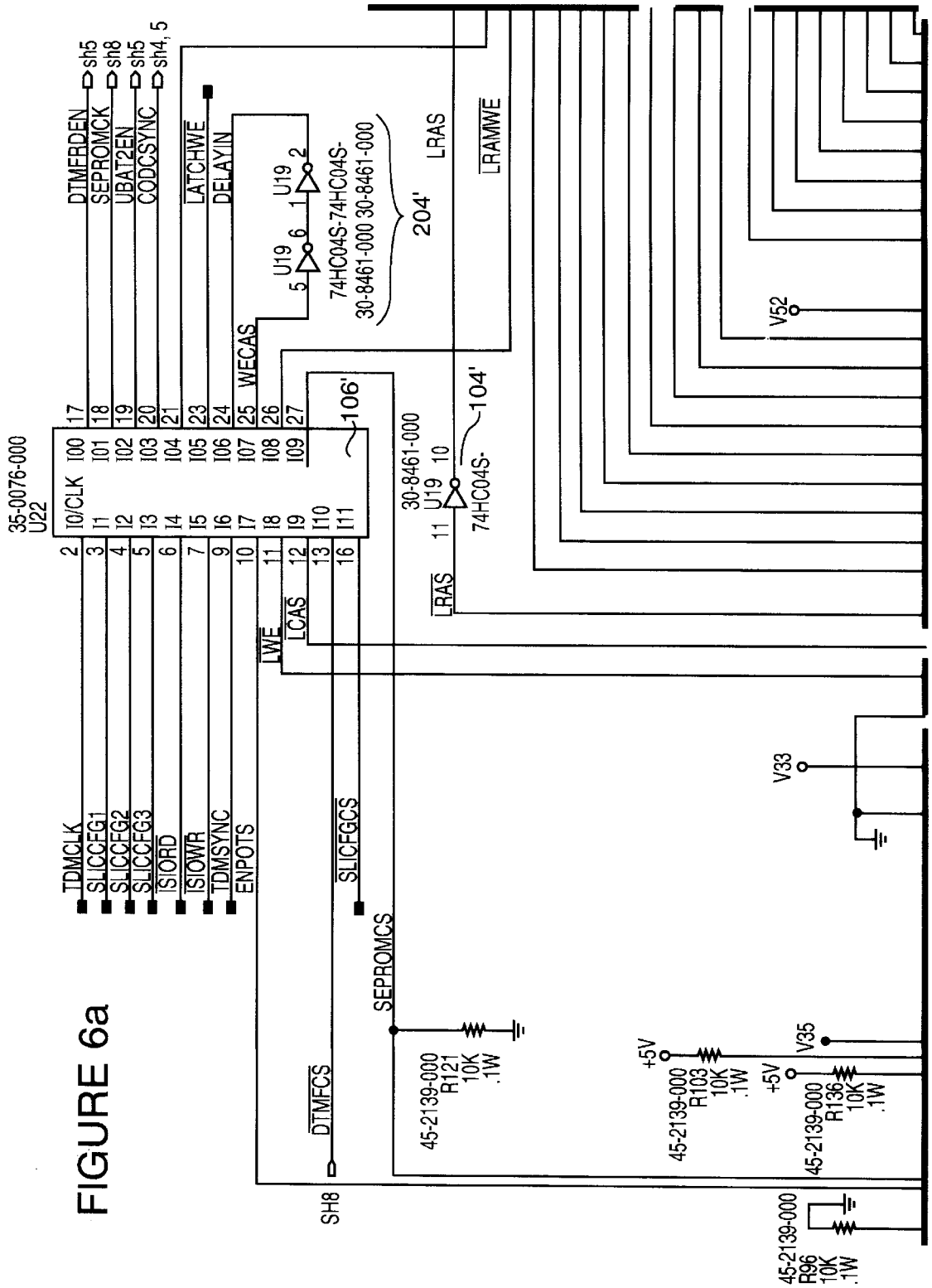
FIG. 6, which includes FIGS. 6a, 6b, and 6c and depicts the arrangement thereof, is a schematic diagram of portions of the system 100 of FIG. 1 relevant to the present invention.
Figure 6B:
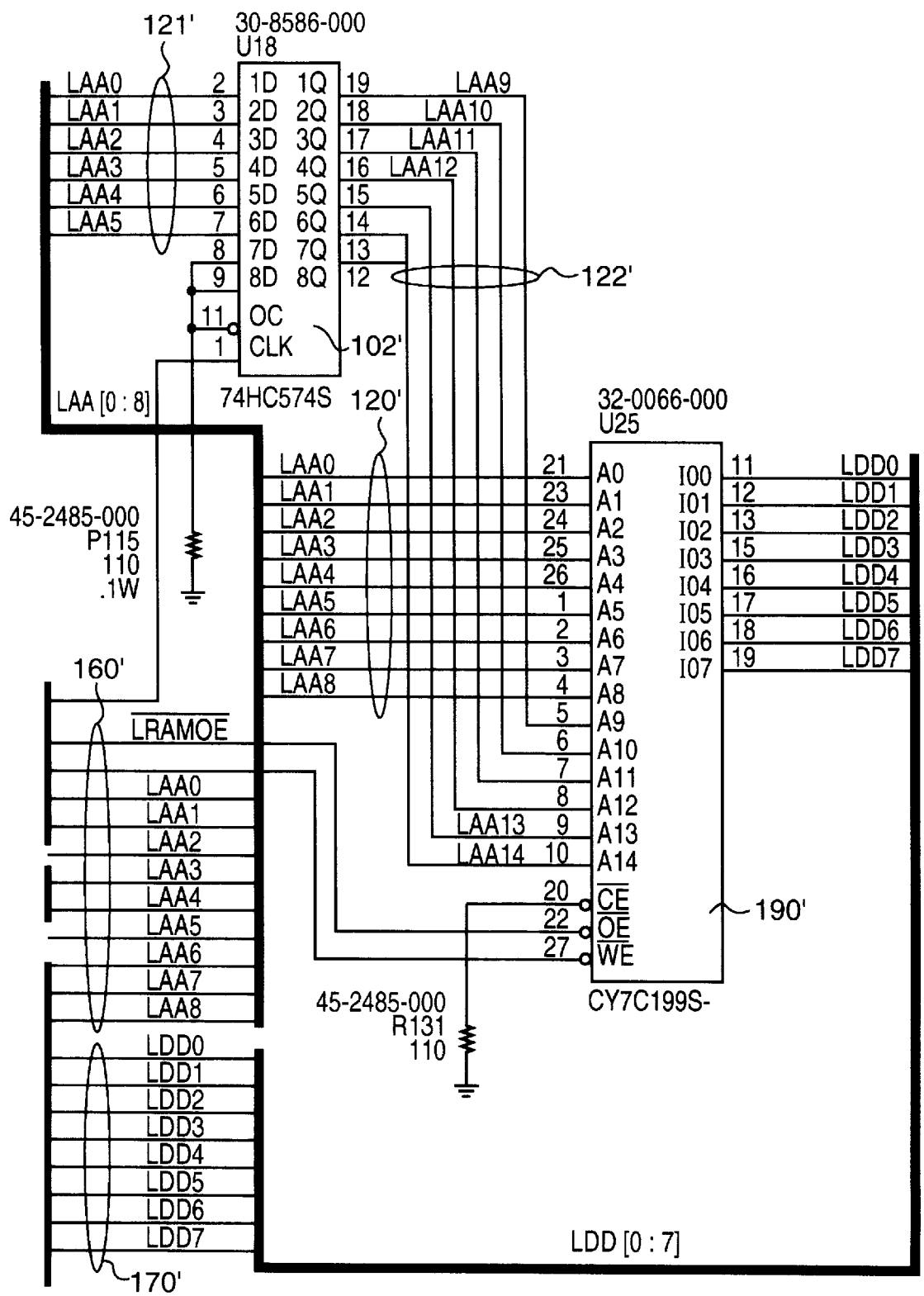
Figure 6C:
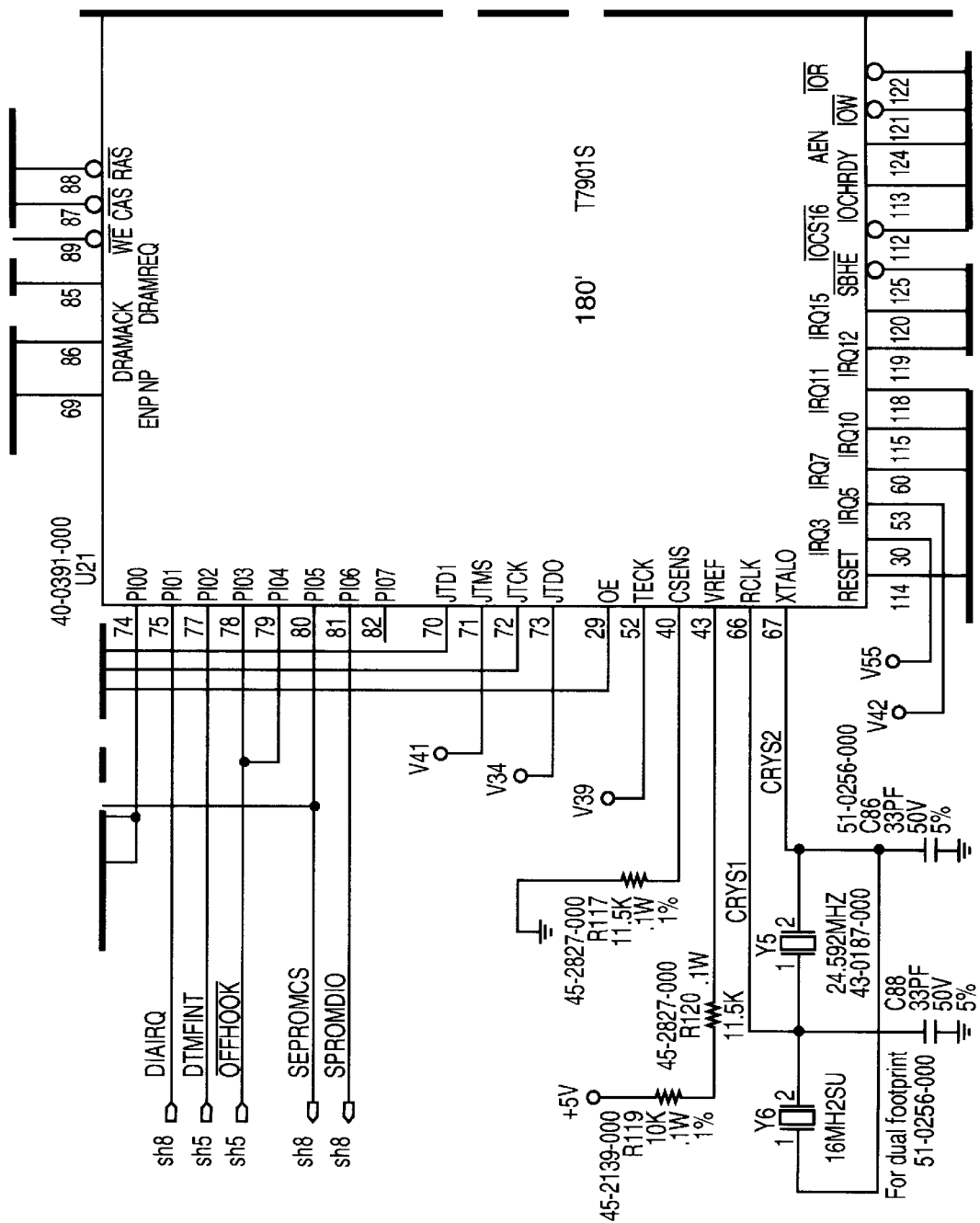
Figure 6D:
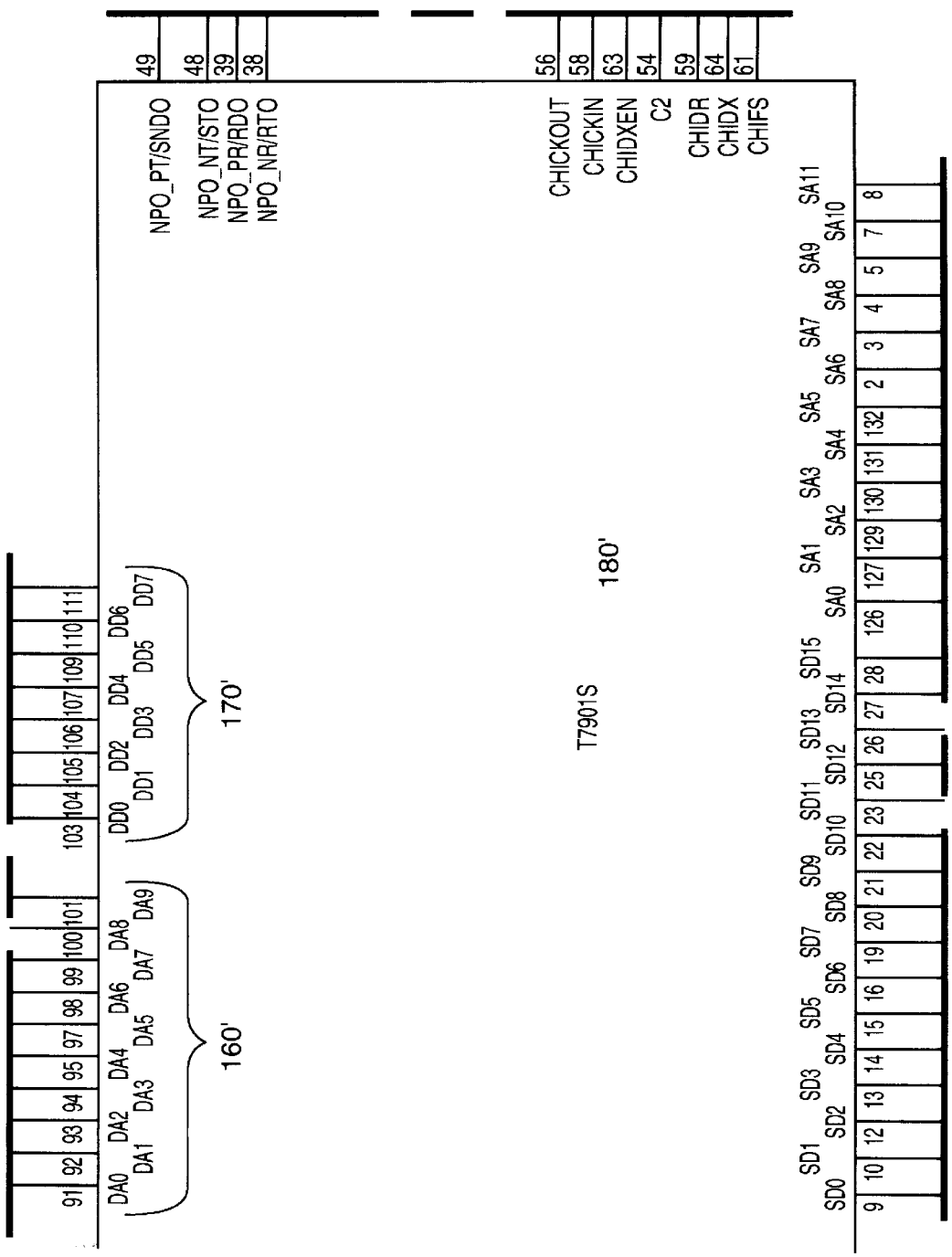
Figure 6E:
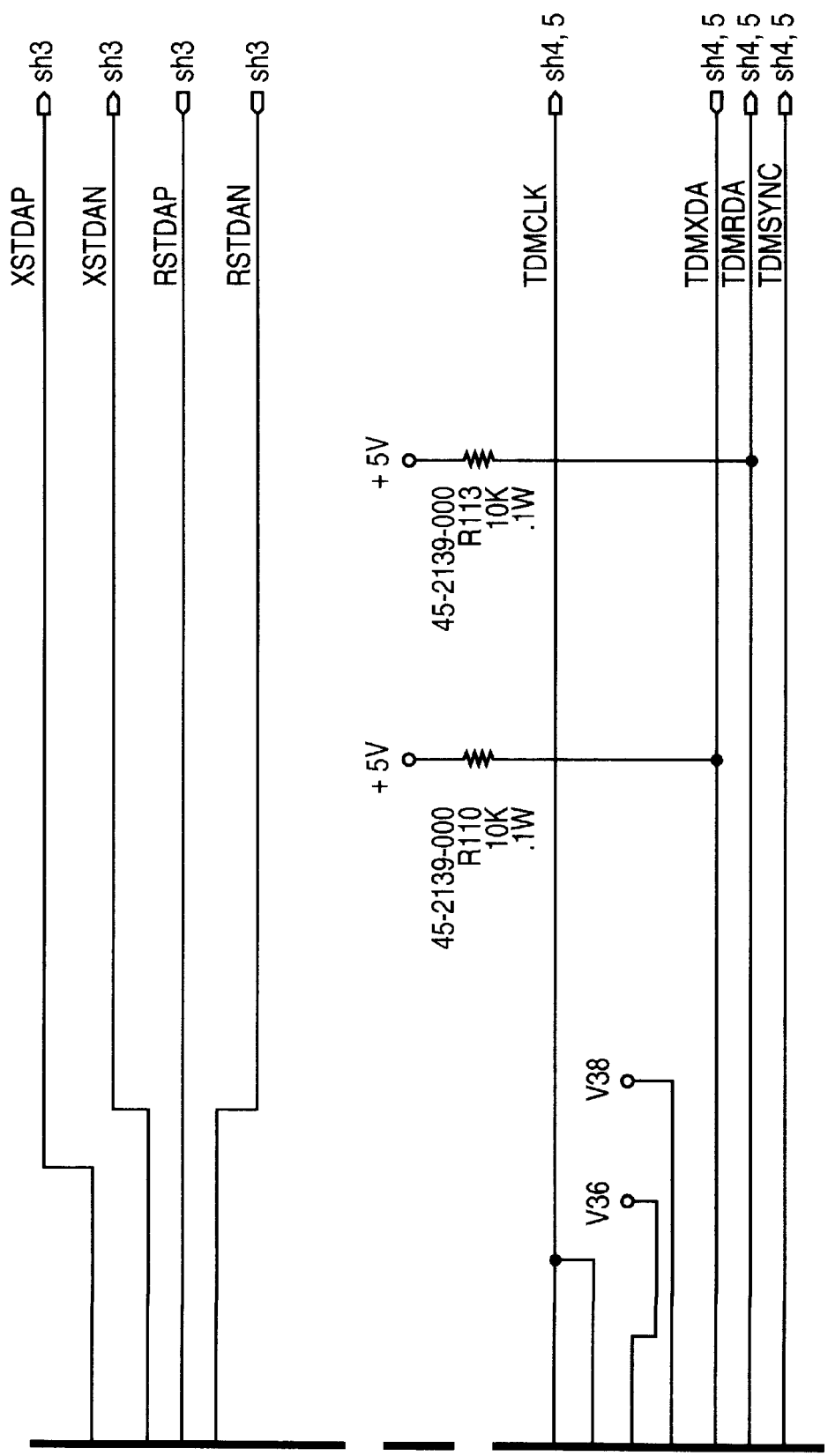
Figure 6F:
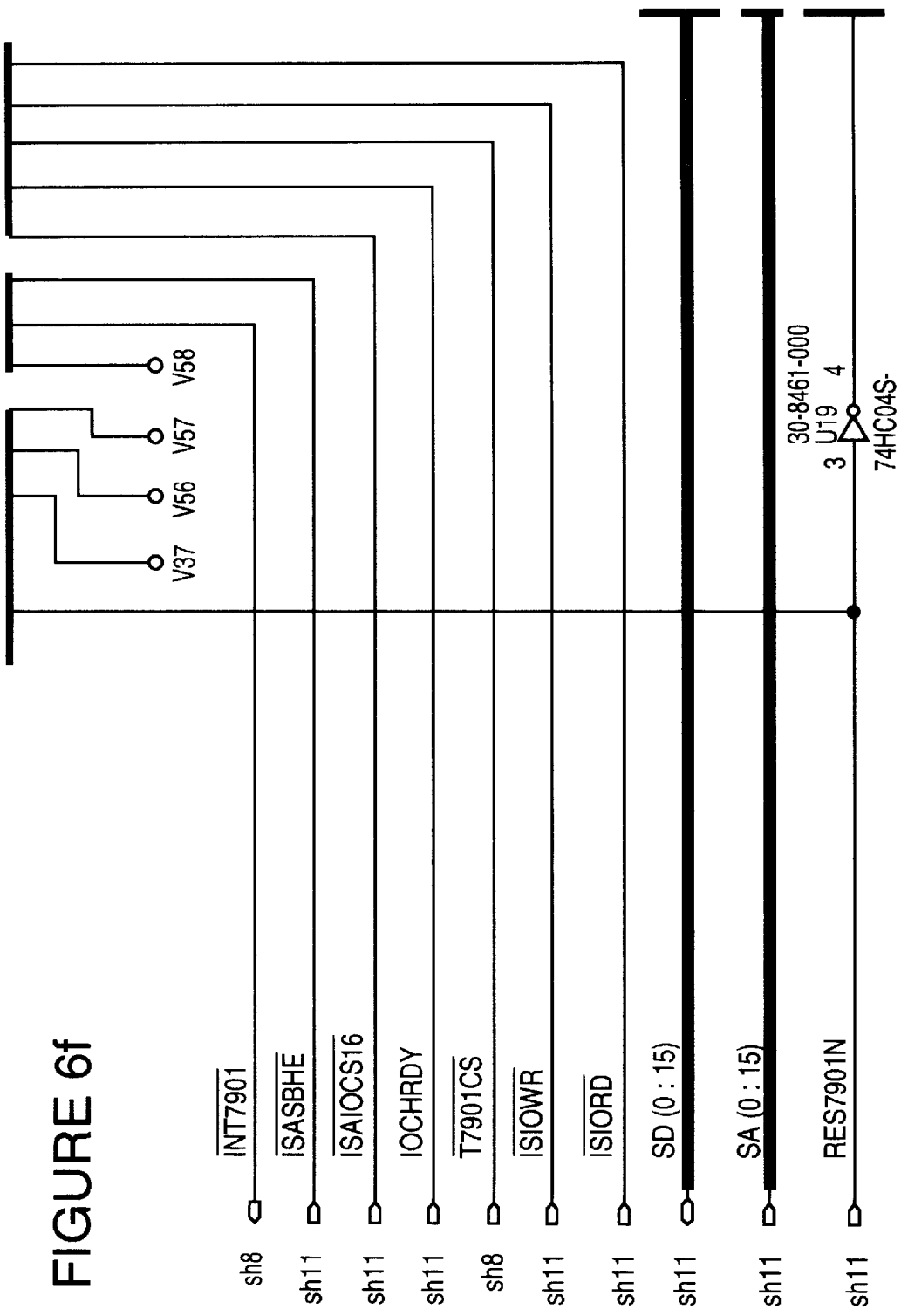
Figure 6G:
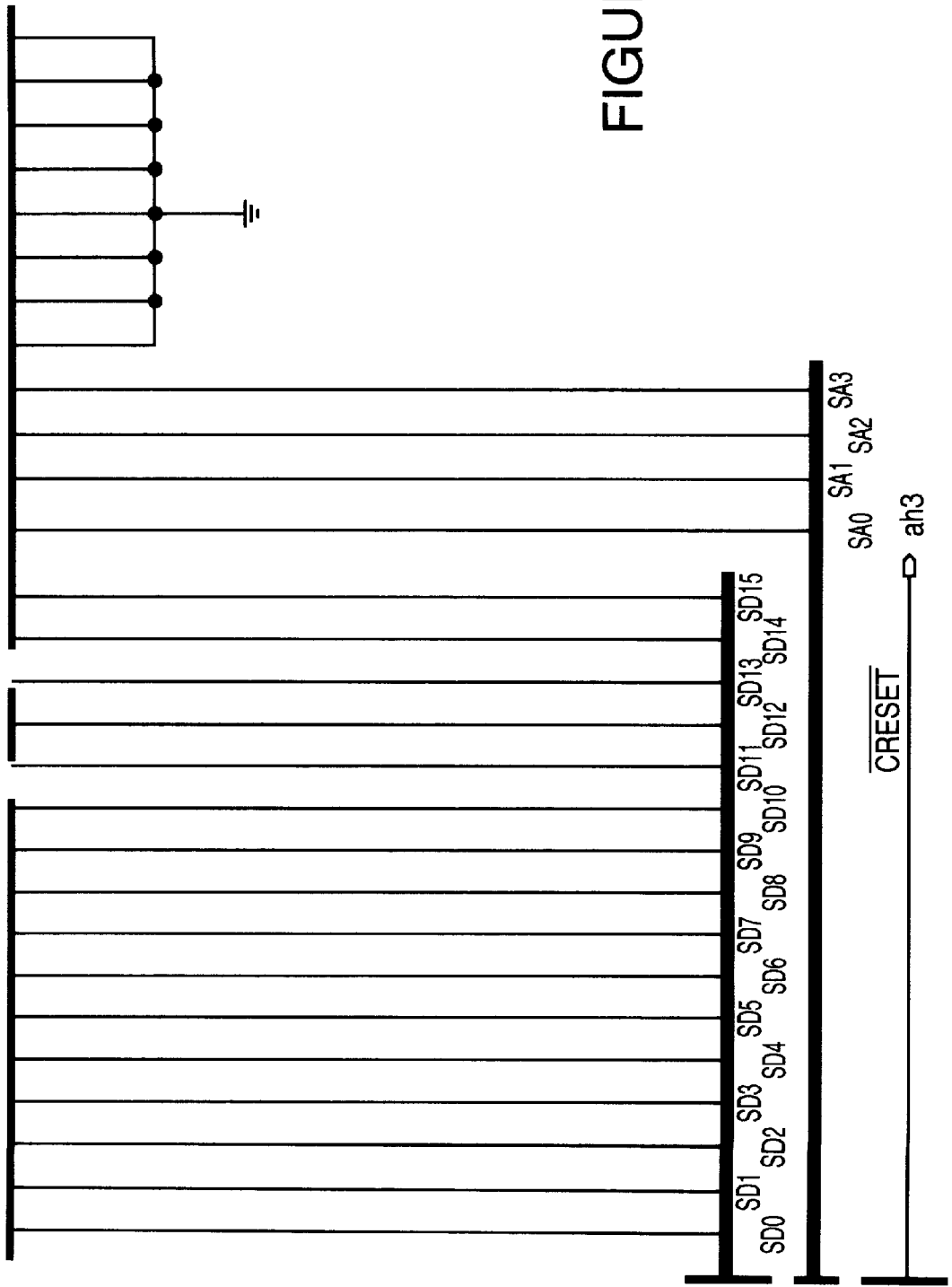

FIG. 6, which includes FIGS. 6a, 6b, and 6c and depicts the arrangement thereof, is a schematic diagram of portions of the system 100 of FIG. 1 relevant to the present invention. Referring first to FIG. 6b, chip 180' is depicted as a high level data link controller model no. T7901 sold by Lucent Technologies. As shown, pin 89 of the chip 180' provides an inverted write enable (WE) signal, pin 87 of the chip 180' provides an inverted column address strobe (CAS) signal, and pin 88 of the chip 180' provides an inverted row address strobe (RAS) signal. Pins 91 through 101 provide address information to the ten (10) bit address bus 160' and pins 103 through 111 connect to the eight (8) bit data bus 170'.

Referring to FIG. 6a, the control logic chip 106' is an appropriately configured programmable logic array (such as part no. PGA 22V10-15, sold by Advanced Micro Devices for example). The inverted write enable signal from pin 89 of the chip 180' is provided to pin 11 of the control logic chip 106'. Similarly, the inverted column address strobe (CAS) signal from pin 87 of the chip 180' is provided to pin 12 of the control logic chip 106'. As is further shown in FIG. 6a, the intermediate signal WECAS is provided at pin 25 of the control logic chip 106'. Dual inverters 204' serve to introduce a delay to the signal WECAS. The delayed intermediate signal DELAYED_WECAS is provided to pin 24 of the control logic chip 106'. The control logic chip 106' provides a SRAM write signal (active low) at pin 26 and an output enable signal at pin 21.

Referring to FIG. 6c, bits 0 through 5 of the address bus 160' are provided, via second partial address bus 121', as inputs to pins 2 through 7 of the latch chip 102' (for example, part no. 74HC574 sold by Texas Instruments and National Semiconductor). Referring to both FIGS. 6a and 6c, the inverted row address strobe signal is provided from pin 88 of chip 180' to the inverter 104'. The row address strobe signal (RAS) output by inverter 104' is provided as a clock input to pin 1 of the latch chip 102'. Bits 0 through 8 of the address bus 160' are provided, via first partial address bus 120', as address bits A0 through A8 at pins 21, 23, 24, 25, 26, 1, 2, 3, and 4 of SRAM chip 190' (for example, a 32K×8 bit SRAM, part no. CY76199-15, sold by Cypress Semiconductor). The latch output at pins 19 through 14 are provided, via latched address bus 122', as address bits A9 through A14 at pins 5 through 10 of the SRAM chip 190'. Referring to FIGS. 6b and 6c, data bus 170' is connected to pins 11 through 19 of the SRAM chip 190'. Finally, referring again to FIGS. 6a and 6c, the output enable signal (active low) provided at pin 21 of control logic chip 106' is presented as an output enable (active low) input at pin 22 of the SRAM chip 190', and the SRAM write enable signal provided at pin 26 of the control logic chip 106' is presented as a write enable (active low) input at pin 27 of the SRAM chip 190'.

Having described the structure of a device of the present invention, the process of the present invention is now described with reference to FIGS. 4 and 5. Later, the operation of the device of the present invention will be described with reference to FIGS. 3a through 3h.

Figure 4:
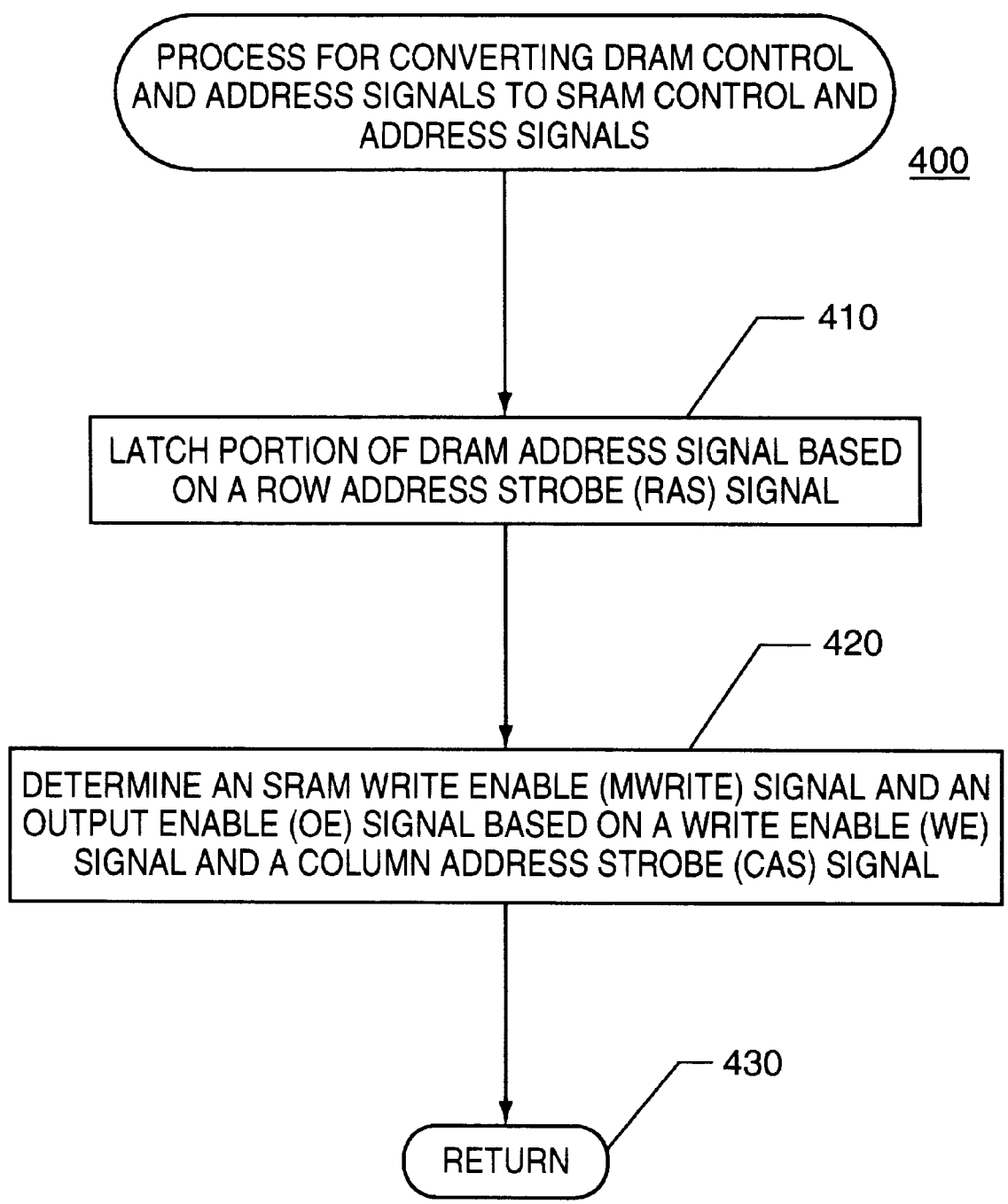
FIG. 4 is a high level flow diagram which illustrates the steps of a method of the present invention.

FIG. 4 is a high level flow diagram of a process 400 for converting DRAM control and address signals to SRAM control and address signals. First, as shown in step 410, a portion of the DRAM address signal is latched based on a row address strobe (RAS) signal. Alternatively, such latching could take place based on the column address strobe (CAS) signal. Referring back to FIG. 1, when the latch 102 is enabled by a pulse at its clock input, it latches bits 0 through 5 of the ten (10) bit address bus 160 which are provided via second partial bus 121. The latch 102 is clocked upon receipt of the RAS signal from line 110.

Next, as shown in step 420, an SRAM write enable (MWRITE) (active low) signal and an output enable (OE) (active low) signal are determined based on a write enable (WE) signal and a column address strobe (CAS) signal. Alternatively, the SRAM write enable and output enable signals could be generated based on a write enable signal and a row address strobe (RAS) signal. Referring to FIGS. 1 and 2, the control logic 106 carries out this step. This step 420 is described in more detail, in the context of the exemplary system, with reference to FIG. 5.

Figure 5:
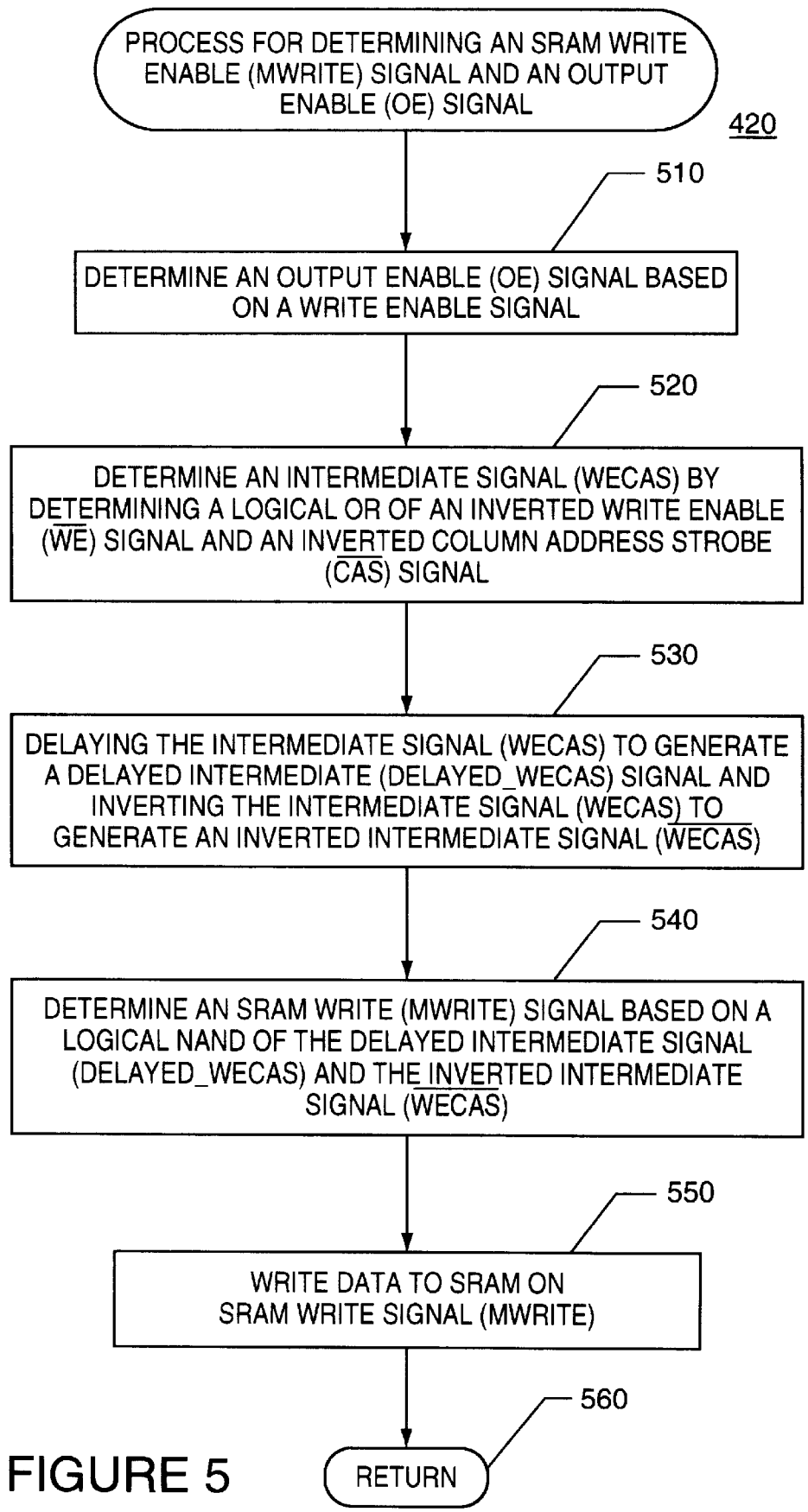
FIG. 5 is a flow diagram which illustrates a process for determining an SRAM write enable signal and an output enable signal.

FIG. 5 is a flow diagram of the step 420 for determining an SRAM write enable (MWRITE) (active low) signal and an output enable (OE) (active low) signal. First, as shown in step 510, an output enable (OE) signal is determined based on a write enable signal. Referring back to FIG. 2, the inverted write enable signal is applied to the inverter 210 which generates an output enable (OE) (active low) signal therefrom. As shown in step 520, an intermediate signal (WECAS) is determined by generating a logical OR of an inverted write enable signal and an inverted column address strobe (or alternatively, an inverted row address strobe) signal. Referring back to FIG. 2, the inverted write enable signal and the inverted column address strobe signals are applied to logical OR gate 202 which generates the intermediate signal WECAS. Then, as shown in step 530, the intermediate signal (WECAS) is delayed to generate a delayed intermediate signal (DELAYED_WECAS) and the intermediate signal is inverted. Referring again to FIG. 2, these steps are effected by the delay 204 and the inverter 206, respectively. Thereafter, as shown in step 540, an SRAM write (MWRITE) (active low) signal is determined based on a logical NAND of the delayed intermediate (DELAYED_WECAS) signal and the inverted intermediate signal. Referring once again to FIG. 2, this step is effected by logical NAND gate 208. Finally, data is written to the SRAM based on the SRAM write signal (MWRITE); in this case, when the SRAM write signal (MWRITE) is active low.

Figure 3:
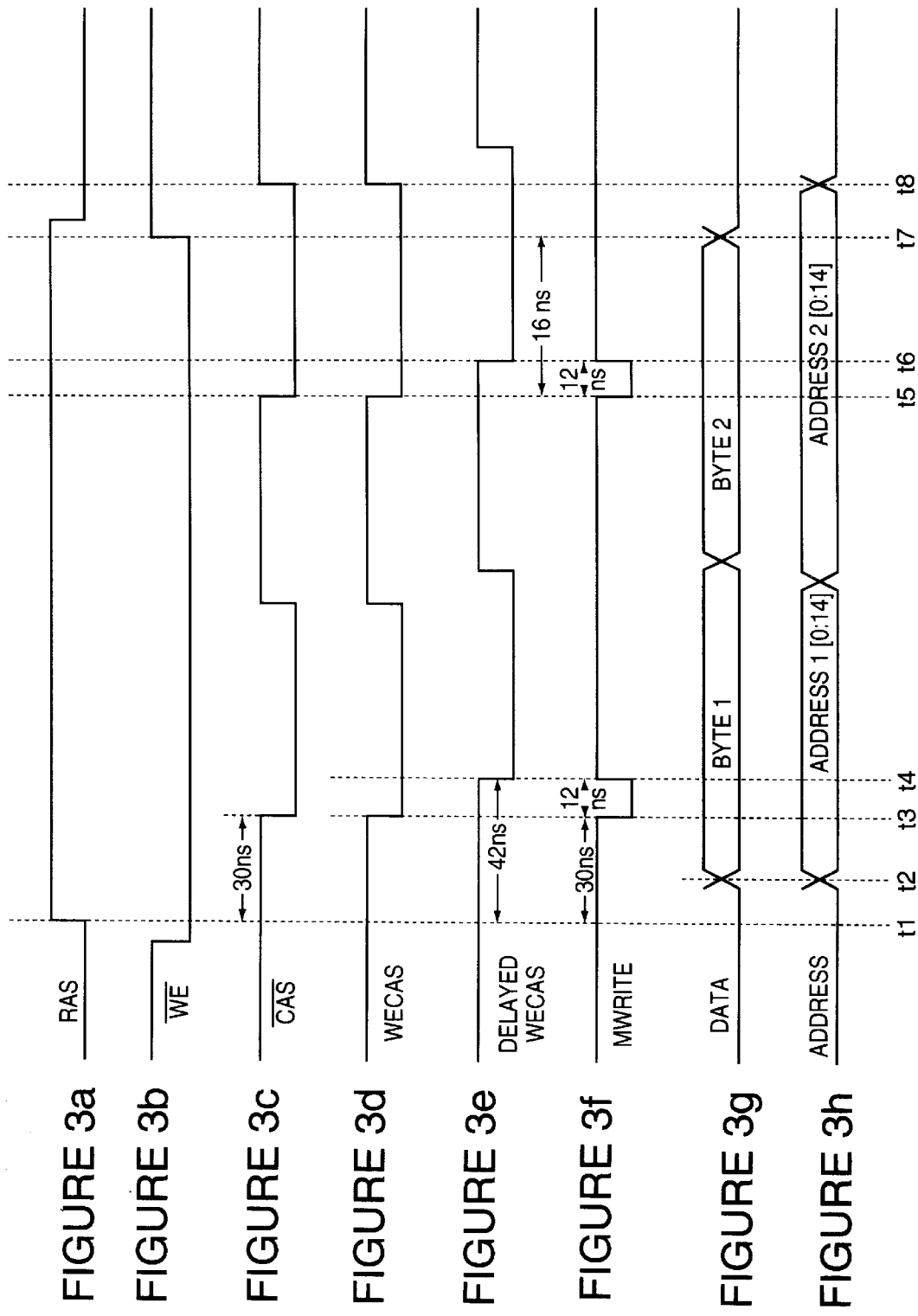
FIGS. 3a through 3h are timing diagrams of signals of the system of FIG. 1.

The operation of the present invention in the system 100 of FIG. 1 will now be described with reference to the timing diagrams of FIGS. 3a through 3h. More specifically, FIGS. 3a through 3h illustrate the signals used when writing two bytes of data to two addresses in the SRAM 190. FIGS. 3a through 3c illustrate the row address strobe (as inverted by inverter 104), inverted write enable, and inverted column address strobe signals, respectively, generated by the chip 180. As shown, the falling edge of the inverted CAS signal occurs after (e.g., 30 ns after) the rising edge of the RAS signal (e.g., at time $t_1$). Referring to FIGS. 3d and 2, the intermediate signal WECAS is generated by logically ORing the inverted write enable and inverted column address strobe signals. Although not shown here, there is a slight temporal offset (e.g., 5–8 ns) between the intermediate signal WECAS and the column address strobe signal due to a time latency introduced by the logical OR gate 202 of the control logic 106. FIG. 3e shows the delayed (e.g., 12 ns) intermediate signal DELAYED_WECAS.

FIG. 3f illustrates the SRAM write enable (MWRITE) (active low) produced by logically NANDing the delayed intermediate signal (DELAYED_WECAS) with an inverted intermediate signal (WECAS). Although not shown here, there is a slight temporal offset (e.g., 5 ns) between the SRAM write (MWRITE) and the signals applied to the logical NAND gate 208 due to a time latency introduced by the logical NAND gate 208. As can be seen from FIGS. 3d, 3e, and 3f, the active low periods (e.g., 12 ns) of the SRAM write enable (MWRITE) signal correspond to the delay time of the delay 204. The active low time of the SRAM write enable (MWRITE) signal is short enough so that data is written to the SRAM when valid data is on the data bus 170. Referring to FIGS. 3f, 3g, and 3h, a valid data and address are available during the first active low period (e.g., $t_3$–$t_4$) of the SRAM write enable (MWRITE) signal. Accordingly, a first byte of data is written to address 1 (which is a concatenation of address bits of the first partial address bus 120 and address bits of the latched address bus 122) of the SRAM 190 during the first active low period of the SRAM write enable (MWRITE) signal. Similarly, a valid data and address are available during the second active low period (e.g., $t_5$–$t_6$) of the SRAM write enable (MWRITE) signal. Accordingly, a second byte of data is written to address 2 (which is a concatenation of address bits of the first partial address bus 120 and address bits of the latched address bus 122) of the SRAM 190 during the second active low period of the SRAM write enable (MWRITE) signal. Referring to FIGS. 3f and 3g, a certain minimum amount of time (e.g., 16 ns) should exist between the falling edge of the active low SRAM write enable (MWRITE) signal and the end of the second byte of valid data to ensure that valid data is written to the SRAM 190.

What is claimed is:

1. In a system comprising:

a static random access memory;

a data bus coupled with the static random access memory;

an address bus, a portion of which is coupled with the static random access memory; and a device coupled with the data bus and generating a row address strobe signal, a column address strobe signal and a write enable signal, wherein a row address and a column address are both applied to the address bus, and the column address strobe signal and the write enable signal are both active low;

a method for generating an address to the static random access memory, the method comprising steps of:

A) latching, at a time based on the row address strobe, at least a portion of the row address applied on the address bus to form latched address bits;

B) concatenating at least a portion of the column address applied on the address bus and the latched address bits to generate the address to the static random access memory; and C) generating an SRAM write enable signal based on the write enable signal and the column address strobe signal, wherein the generating step comprises the steps of:

c1) logically ORing the write enable signal and the column address strobe signal to generate an intermediate signal;

c2) delaying the intermediate signal to generate a delayed intermediate signal;

c3) inverting the intermediate signal to generate an inverted intermediate signal; and c4) logically NANDing the delayed intermediate signal and the inverted intermediate signal to generate the SRAM write enable signal.

2. The method of claim 1 wherein the delay applied to the intermediate signal is approximately 15 ns.

3. The method of claim 1 wherein the delay applied to the intermediate signal is no more than 15 ns.

4. In a system comprising:

a static random access memory;

a data bus coupled with the static random access memory;

an address bus, a portion of which is coupled with the static random access memory; and a device coupled with the data bus and generating a row address strobe signal, a column address strobe signal and a write enable signal, wherein a row address and a column address are both applied to the address bus, and the row address strobe signal and the write enable signal are both active low;

a method for generating an address to the static random access memory, the method comprising steps of:

A) latching, at a time based on the column address strobe, at least a portion of the column address applied on the address bus to form latched address bits;

B) concatenating at least a portion of the row address applied on the address bus and the latched address bits to generate the address to the static random access memory; and C) generating an SRAM write enable signal based on the write enable signal and the row address strobe signal; wherein the generating step comprises the steps of:

C1) logically ORing the write enable signal and the row address strobe signal to generate an intermediate signal;

C2) delaying the intermediate signal to generate a delayed intermediate signal;

C3) inverting the intermediate signal to generate an inverted intermediate signal; and C4) logically NANDing the delayed intermediate signal and the inverted intermediate signal to generate the SRAM write enable signal.

5. The method of claim 4 wherein the delay applied to the intermediate signal is approximately 15 ns.

6. The method of claim 4 wherein the delay applied to the intermediate signal is no more than 15 ns.

7. An apparatus, for use with a system comprising:

a static random access memory;

a data bus coupled with the static random access memory;

an address bus; and a device coupled with the data bus and generating a row address strobe signal, a column address strobe signal and a write enable signal, wherein a row address and a column address are applied to the address bus for generating an address to the static random access memory; wherein the apparatus further comprises:

A) a first address bus, coupling at least a portion of the address bus with a first portion of an address input of the static random access memory;

B) a second address bus, coupled with at least a portion of the address bus;

C) a third address bus, coupled with a second portion of the address input of the static random access memory; and D) a latch, responsive to an applied clock signal based on either of the row address strobe signal or the column address strobe signal, the latch comprising:

D1) an input coupled with the second address bus; and

D2) an output coupled with the third address bus; and

E) control logic for generating an SRAM write enable signal provided to a write enable input of the static random access memory and based on the write enable signal and either the column address strobe signal or the row address strobe signal; wherein the control logic comprises:

E1) a logical OR gate, having a first input provided with the write enable signal, a second input provided with either the row address strobe signal or column address strobe signal, and an output providing an intermediate signal;

E2) a delay unit, having an input coupled with the output of the logical OR gate and having an output providing a delayed intermediate signal;

E3) an inverter, having an input coupled with the output of the logical OR gate and having an output providing an inverted intermediate signal; and E4) a logical NAND gate, having a first input coupled with the output of the delay unit, a second input coupled with the output of the inverter, and an output coupled with a write enable input of the static random access memory.

8. The apparatus of claim 7 wherein the delay unit introduces a delay of approximately 15 ns.

9. The apparatus of claim 7 wherein the delay unit introduces a delay of no more than 15 ns.

* * * * *